United States Patent
Fu et al.

(10) Patent No.: US 12,547,723 B2
(45) Date of Patent: Feb. 10, 2026

(54) SYSTEM AND METHOD TO SUPPORT SMM UPDATE AND TELEMETRY IN RUNTIME FOR BAREMETAL DEPLOYMENT

(71) Applicant: Intel Corporation, Santa Clara, CA (US)

(72) Inventors: Siyuan Fu, Shanghai (CN); Murugasamy K. Nachimuthu, Beaverton, OR (US); Suryakanth Sekar, Bangalore (IN); Wei Xu, Shanghai (CN); Ruixia Li, Shanghai (CN); Chuan Song, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 992 days.

(21) Appl. No.: 17/483,207

(22) Filed: Sep. 23, 2021

(65) Prior Publication Data

US 2022/0198017 A1    Jun. 23, 2022

(51) Int. Cl.
*G06F 9/44* (2018.01)
*G06F 8/656* (2018.01)
*G06F 21/57* (2013.01)

(52) U.S. Cl.
CPC ............ *G06F 21/572* (2013.01); *G06F 8/656* (2018.02); *G06F 2221/033* (2013.01)

(58) Field of Classification Search
CPC ... G06F 8/656; G06F 21/572; G06F 2221/033
See application file for complete search history.

(56) References Cited

U.S. PATENT DOCUMENTS

| | | | | |
|---|---|---|---|---|
| 8,863,109 B2* | 10/2014 | Skalsky | ............... | G06F 8/656 717/168 |
| 10,986,174 B1* | 4/2021 | Sharma | ............... | H04L 12/4641 |
| 2013/0151831 A1* | 6/2013 | Bealkowski | ........ | G06F 9/45533 713/2 |
| 2022/0197746 A1* | 6/2022 | Chu | ........................ | G06F 8/65 |
| 2023/0031302 A1* | 2/2023 | Hong | .................... | G06F 8/654 |

* cited by examiner

*Primary Examiner* — Qamrun Nahar
(74) *Attorney, Agent, or Firm* — Compass IP Law PC

(57) ABSTRACT

Systems and methods to support system management mode (SMM) update and telemetry in runtime for bare metal deployments. During runtime operation of a host operating system on a bare metal platform having a management controller and including a processing unit on which the host operating system (OS) and host BIOS are executed, an out-of-band runtime update is performed to update secure execution mode (e.g., SMM) runtime firmware for the bare metal platform using an out-of-band channel comprising an interrupt driven, shared memory-based data exchange channel between the management controller and the host BIOS. This enables secure execution mode runtime firmware to be updated without during runtime without having to reboot the platform or restart the OS kernel. The out-of-band channel also supports exchange of telemetry data logged by the host BIOS during the runtime update with the management controller.

20 Claims, 9 Drawing Sheets

SYSTEM AND METHOD TO SUPPORT SMM UPDATE AND TELEMETRY IN RUNTIME FOR BAREMETAL DEPLOYMENT

PRIORITY

This application claims the benefit of priority to Patent Cooperation Treaty (PCT) Application No. PCT/CN2021/110756 filed Aug. 5, 2021. The entire content of that application is incorporated by reference.

BACKGROUND INFORMATION

The business model of at-scale deployment of a fleet of servers, drives the imperative that system resets should be avoided and should only be treated as an option of last resort. This is driven by the fact that Cloud Service Providers (CSPs) would incur significant cost of system downtime and workload disruption caused by system resets or Kernel restarts. At the same time, increasingly, there are CSP demands for runtime reconfiguration, security fixes, etc.

This poses a few problems. For example, one problem results from injecting a platform configuration/behavior change or security fix. These are typically a one-time injection of a profile or policy reconfiguration, or a security fix to lock a register down. For instance, there could be some performance knobs or error severity mapping that need to be reconfigured, or a need to lock a register as a result of a security fix. In addition, these configuration registers could be protected by SMM (System Management Mode) privileges (e.g., only code with SMM privileges will be able to modify them). Even if they are Ring-0 accessible, it would require a significant Operating System (OS) enabling effort/Kernel changes that will require a Kernel restart, which is disruptive.

Seamless SMM Runtime Update is critical to address CSP customer pain-points on service interruption from SMM service update. However, it is a significant challenge for CSPs to maintain a separate in-band update agent in the Operating System (OS) for SMM runtime update, which brings extra cost to the CSP business model of at-scale deployment.

Under another problem a vendor provides microcode (uCode) patches for processor bug/security fixes. Oftentimes, a given uCode patch can produce a new Machine Specific Register (MSR) for certain configurations, which would need to be programmed to make it effective. Today, an OS kernel patch must be provided before the uCode update release. The customer must patch their OS kernel ahead of the uCode patch update, and this typically would require kernel patching, and platform/kernel reset, which is disruptive. These require a BIOS (e.g., Firmware) update and/or a Kernel update followed by a system reset/Kernel reset, for it to take effect, which goes against the ethos and requirement of avoiding highly disruptive system/kernel restarts.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
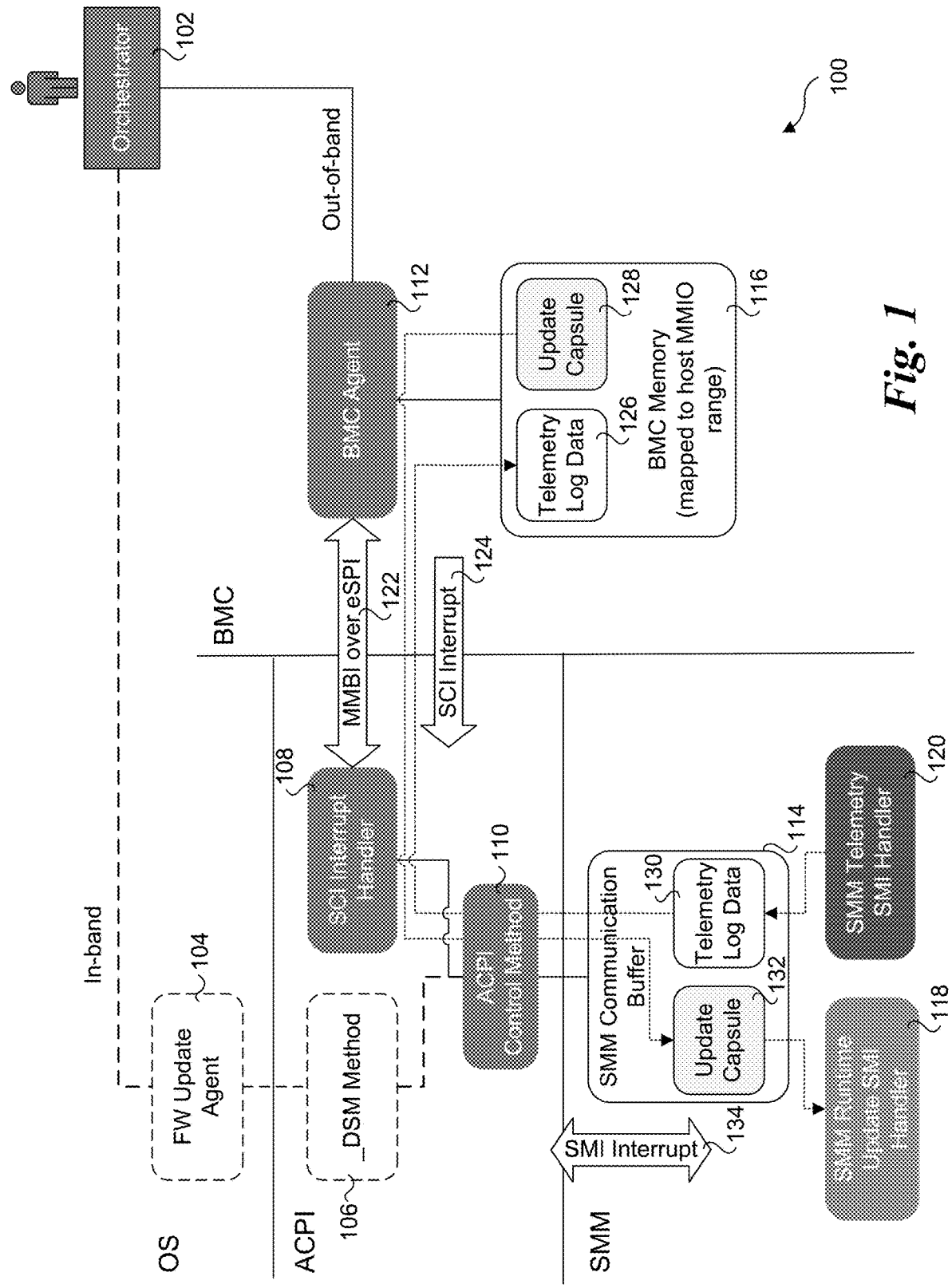
FIG. 1 is a schematic diagram illustrating a high-level system and architecture 100 of a SMM runtime update solution, according to one embodiment.

Embodiments of systems and methods to support SMM update and telemetry in runtime for bare metal deployments are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

FIG. 1 shows a high-level system and architecture 100 of an SMM runtime update solution, according to one embodiment. The components include an orchestrator 102, a removed firmware (FW) update agent 104 and a removed_DSM method 106 (shown in dashed outline to indicate they have been removed), an SCI interrupt handler 108, an ACPI control method 110, a baseboard management controller (BMC) agent 112, and SMM communication buffer 114, on-chip BMC memory 116, an SMM runtime update SMI handler 118 and an SMM telemetry SMI handler 120. The components are partitioned as host OS (software) components, Advanced Configuration and Power Interface (ACPI) components, BMC components, and SMM (firmware) components.

The system of architecture 100 uses BMC agent 112 to act as the update agent using an out-of-band (OOB) channel, instead of a dedicated FW update agent 104 previously used in host OS for the in-band (IB) channel. BMC agent 112 interacts with orchestrator 102 (e.g., an administrator) to monitor system state and manage the runtime firmware update. As used herein, "in-band" means a communication channel that employs communication facilities provided by an operating system, such as a network software stack. Also, as used herein, "out-of-band" means a communication channel that does not employ communication facilities provided by an operating system. As a result, out-of-band communications are implemented separate and apart from communications involving the host operating system.

In one embodiment, an enhanced Serial Peripheral Interface (eSPI)-based Memory Mapped BMC Interface (MMBI) protocol is used for data exchanges between BMC and the host BIOS (ACPI and SMM) for the system. For example, BMC agent 112 is shown as communicating with SCI interrupt handler 108 via an MMBI over eSPI link 122.

A portion of BMC memory 116 is mapped to a host Memory Mapped Input-Output (MMIO) region through the eSPI-based MMBI protocol, which provide an efficient communication channel to transfer necessary commands and update image during the SMM runtime update. Further details of the eSPI-based MMBI protocol are described below with reference to FIG. 5. However, the use of the eSPI-based MMBI protocol illustrated and discussed herein is merely exemplary and non-limiting, as other existing and future data transport mechanisms may also be used, such as but not limited to PCIe.

SCI interrupt handler 108 (or other interrupt mechanism such as an SMI or a GPIO (General Purpose IO) interrupt) in host firmware is used to allow the BMC to initiate an SMM runtime update (comprising SMM code injection or an SMM driver update) or retrieve SMM telemetry log data. SCI interrupt handler 108 is responsible for retrieving MMBI commands from BMC agent 112, process the request data, trigger a corresponding SMI handler, and respond to BMC with the result.

A mechanism is provided to encode ACPI objects into a binary stream, or vice versa, which allows the BMC to send command to host BIOS, and trigger ACPI control method 110 to execute the SMM runtime update functions with specified parameters. This provides compatibility with previous in-band SMM runtime update solutions, thus allowing a CSP customer to make use of IB/OOB channel on the same platform as needed, or add a new OOB mechanism to existing platforms without significant modification of the platform firmware.

As further shown in FIG. 1, telemetry log data 126 and update capsule 128 are stored in BMC memory 116. Similarly, SMM communication buffer 114 includes telemetry log data 130 and update capsule 132. SMM communication buffer is implemented in a portion of system memory that is only accessible while operating in System Management Mode, and thus is not accessible to any software running on the platform, including the host OS.

Figure 2A:
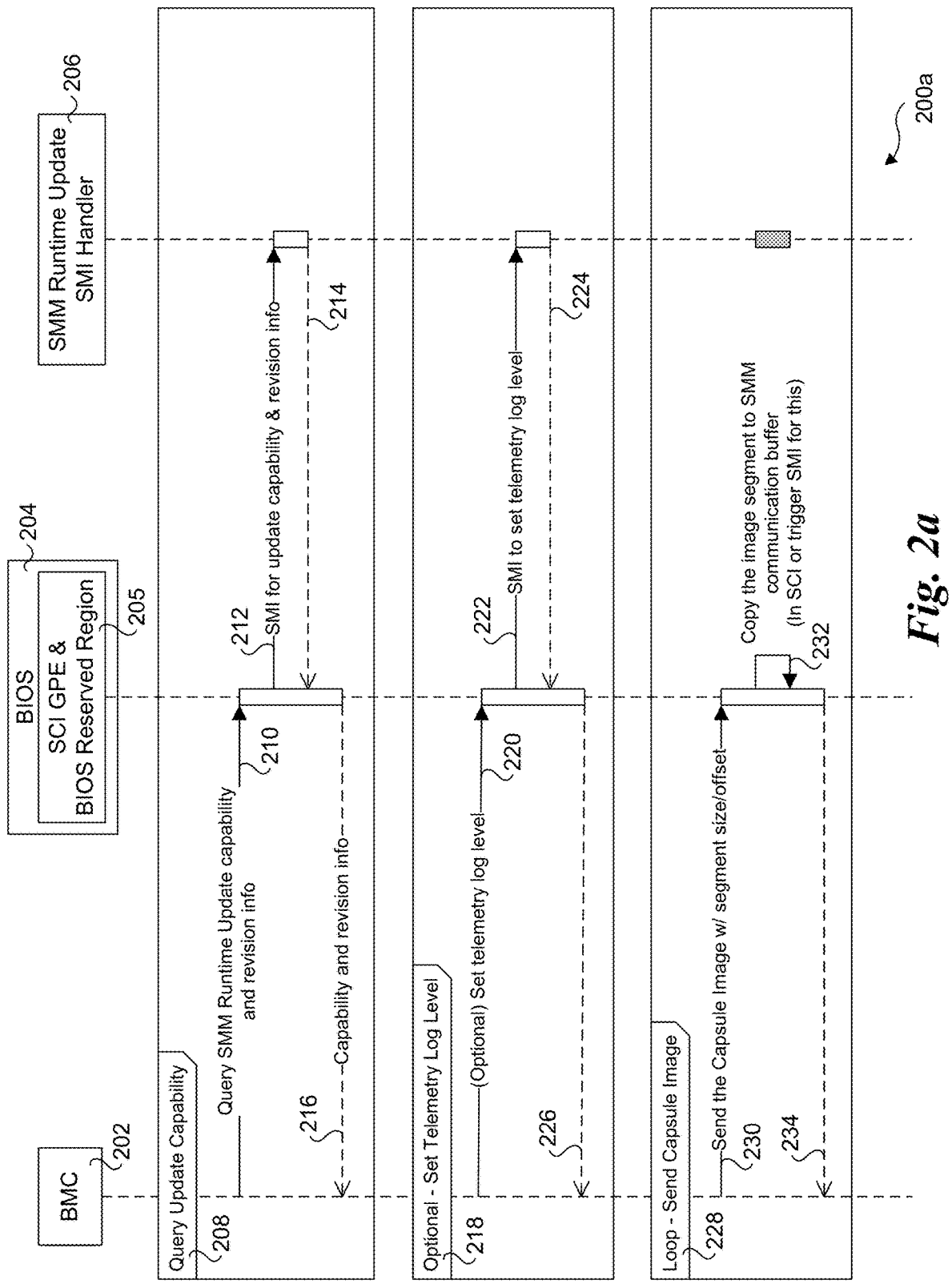
FIGS. 2a and 2b illustrate respective portions of a message flow diagram illustrating the overall workflow of an OOB SMM runtime update, according to one embodiment.
Figure 2B:
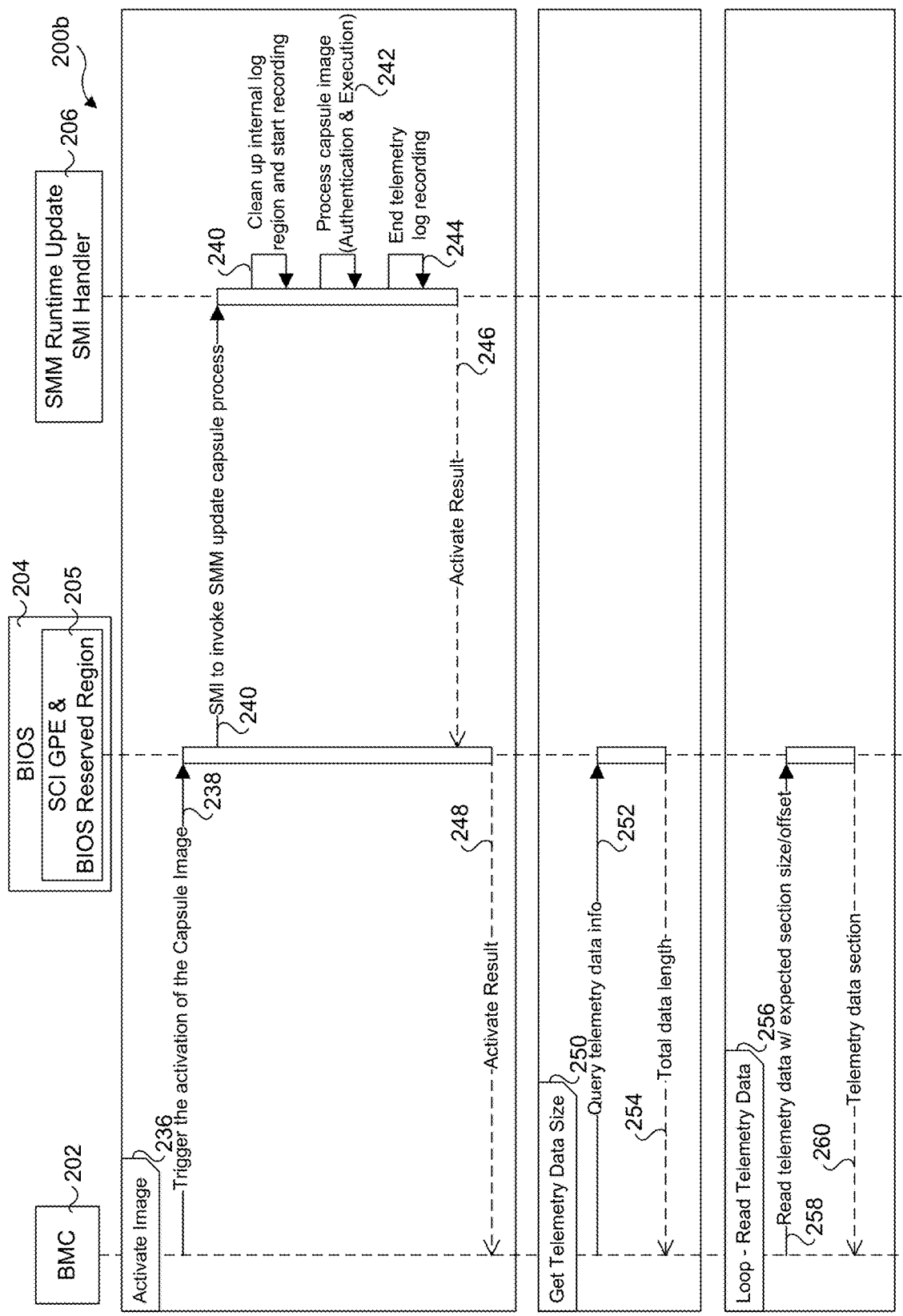

FIGS. 2a and 2b illustrate respective portions 200a and 200b of a message flow diagram illustrating the overall workflow of an OOB SMM runtime update, according to one embodiment. The messages are transmitted between a BMC 202, BIOS 204 including an SCI GPE & BIOS reserved region 205 (in system memory), and an SMM runtime update SMI handler 206. The first block in FIG. 2a depicts a query update capability 208 under which BMC 202 queries the SMM Runtime Update capability information from BIOS and exposes this information to the orchestrator to prepare for the update. Non-limiting examples of capability information include the platform ID, firmware revision, update history, supported update image type, etc.

As shown, BMC 202 sends a message 210 to BIOS 204 comprising a query for an SMM runtime update capability and revision information. Upon receipt of message 210, BIOS 204 invokes an SMI 212 for update capability and revision information that is handled by SMM runtime update and SMI handler 206, which then returns the SMM runtime update capability and revision information via a message 214 that is forwarded by BIOS 204 to BMC 202, as depicted by messages 214 and 216. At this point BMC 202 can expose the SMM runtime update capability information to the orchestrator (not shown).

The second block in FIG. 2a is an optional Set Telemetry Log Level block 218. This is an optional block for BMC 202 to adjust the SMM Telemetry Log record level to platform BIOS. As illustrated, BMC 202 sends a message 220 to set the telemetry log level to BIOS 204. Upon receipt of message 220, BIOS 204 invokes an SMI 222 for SMM runtime update and SMI handler 206 to set the telemetry log level. Upon completion, SMM runtime update and SMI handler 206 returns a completion message 224 to BIOS 204, which is forwarded via a message 226 to BMC 202

The third block in FIG. 2a is a Send Capsule Image block 228. In this block BMC 202 sends the update capsule image to platform BIOS through the shared memory based communication channel. As depicted by a message 230, BMC 202 sends an image segment of the capsule image with a segment size and offset to BIOS 204. The image segment is then copied to the SMM communication buffer as depicted by loop 232. This may be performed in SCI or by triggering SMM runtime update SMI handler 206 with an SMI to handle this. A completion message 234 is then returned to BMC 202. In some embodiments, the BMC may break the capsule image into small fragments and transmit them in sequence if the shared memory buffer is not large enough to hold the whole capsule image. Thus, the illustrated messages and loop operation would be repeated two or more times.

Moving to flowchart portion 200b in FIG. 2b, the next block comprises an Activate Image block 236. In this block the BMC send a command to BIOS to trigger the activation of the new update capsule image. BIOS will raise an SMI to start SMM Runtime Update process inside SMRAM (System Management Random Access Memory), including image authentication, new SMM driver activation, as well as record the update log into SMM telemetry service.

BMC 202 sends a message 238 to BIOS 204 to trigger activation of the capsule image. In response to receiving the trigger, BIOS 204 raises an SMI 240 to invoke the SMM update capsule process. SMM runtime update SMI handler 206 then performs three operations, including cleaning up the internal log region and start recording, as depicted by loop 240. As depicted by a loop 242, the capsule image is then processed, which includes authentication and execution. In the third process 244 the telemetry log recording is ended. SMM runtime update SMI handler 206 then send a message 246 with the activate result to BIOS 204, which forwards the activation result via a message 248 to BMC 202.

Next, the BMC retrieves the telemetry log data, which includes a Get Telemetry Data Size block 250 and a Read Telemetry Data loop 256. First, BMC 202 sends a query 252 to BIOS 204 for the telemetry data information. In a message 254, BIOS 204 returns the total data length of the telemetry data.

Moving to Read Telemetry Data loop 256, BMC 202 sends a read request 258 to read the telemetry data from the update process (e.g., the update log information recorded in Activate Image block 236) with an expected section size and offset. In response, SCI GPE & BIOS returns the requested telemetry data section, as depicted by a message 260. The read request and return of the requested telemetry data section may be repeated in a loop-wise manner until all the telemetry data has been read.

Data Exchange Mechanism

In accordance with an aspect of some embodiments, an interrupt driven, shared memory-based channel for a data exchange channel between BMC and host BIOS is provided. The OOB SMM Runtime Update is initiated and managed by the BMC with a FIFO (First-In, First-Out) request/response manner. The OOB operations described herein begin with a request message in an MMBI B2H (BMC to Host) buffer placed by the BMC and ended by the corresponding response in an H2B (Host to BMC) buffer from the host side.

Once the BMC places a new command message in its B2H buffer, it raises an interrupt to notify the host BIOS of the new incoming request, which results in a ACPI SCI event triggered in the host side. The SCI event handler will check the B2H buffer to process any command from BMC, and make responses into the H2B buffer.

Figure 3:
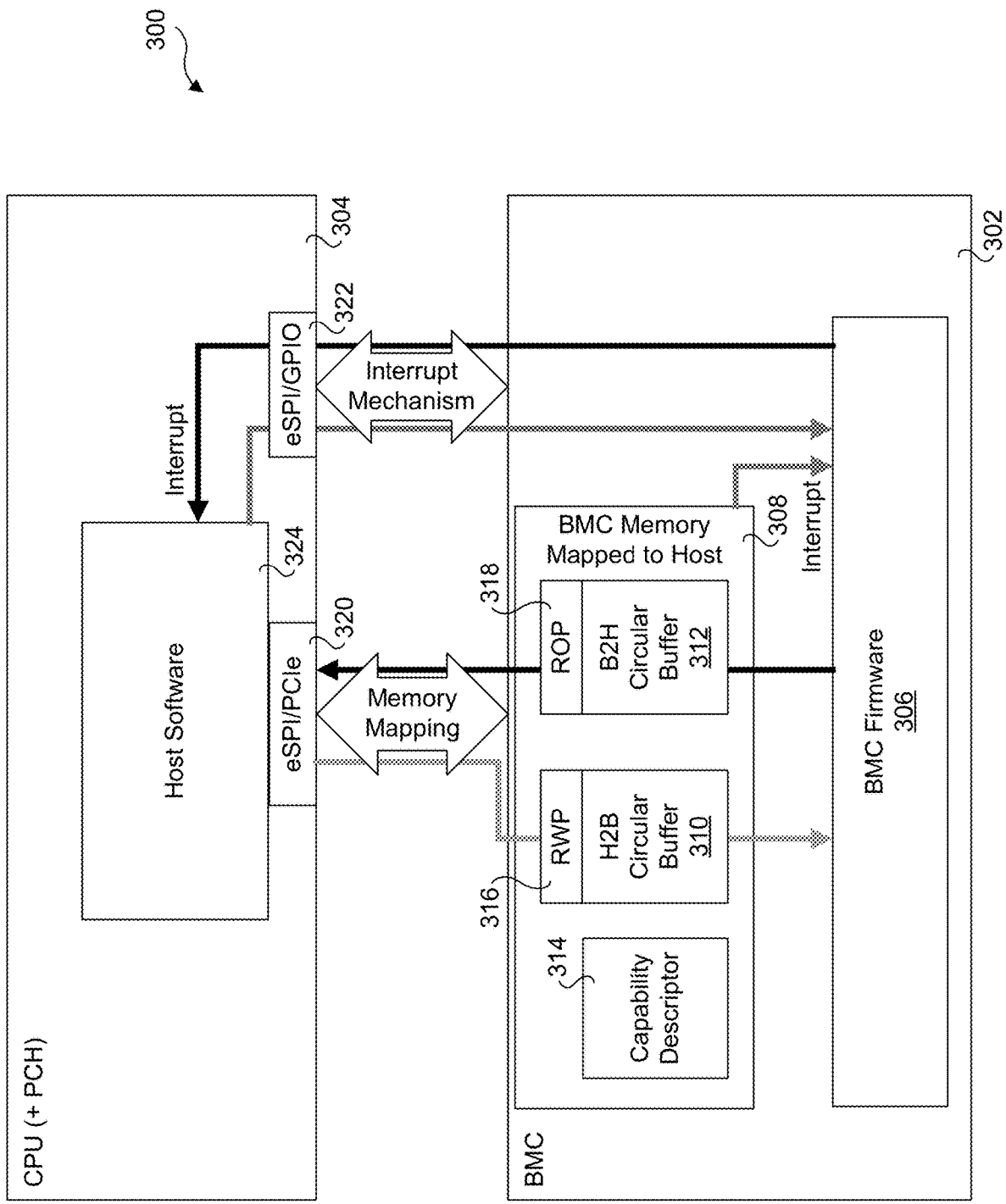
FIG. 3 shows a diagram illustrating an overview of a single instance of the MMBI concept, according to one embodiment.

FIG. 3 shows a diagram 300 illustrating an overview of a single instance of the MMBI concept. The top-level components are a BMC 302 and a CPU (+PCH) 304, which is illustrative of either a CPU (see FIG. 6 below) or a CPU coupled to a Platform Controller Hub (PCH) (see FIG. 6a below). BMC 302 includes BMC firmware 306 and on-chip memory for which a portion comprises BMC memory mapped to host memory 308 that is used for an H2B buffer 310, a B2H buffer 312 and an MMBI capability descriptor 314. The MMBI capability descriptor includes a Host RO (Read Only) portion and a Host RW (Read Write). The data structures also include Host RO pointers (ROP 316) and Host RW pointers (RWP 318).

CPU (+PHC) 304 is depicted as including multiple IO interfaces that are illustrative of IO interfaces that may be on a CPU or on a PCH. These IO interfaces include an eSPI/PCIe interface 320 and an eSPI/GPIO interface 322, where the '/' indicates one of the interfaces in the pair would be used. For example, for data transport of memory-mapped data, an eSPI link or a PCIe link may be used. The interrupt mechanism may employ eSPI or a GPIO pin. Host software 324 is also run on the CPU, including the host operating system. The host software is stored in system memory that is accessed by the CPU (not shown).

MMBI capability descriptor 314 is used to define the MMBI channel details like capabilities, protocol types supported, and further on. The host must read these descriptors to understand the number and types of instances supported by the BMC and accordingly use it.

In one embodiment H2B buffer 310 and B2H buffer 312 are circular buffers. Each buffer is a memory range defined in the descriptor with the following access:

The H2B buffer is RW for the host and RO for the BMC.
The B2H buffer is RO for the host and RW for the BMC.
The read pointer and the write pointer are used to indicate the read and write location in the buffer. For each read or write, the pointer is advanced. These pointers, along with a depth field, are used to calculate the number of filled bytes in the buffer to read or the number of empty bytes available for the write. The circular buffers are used to send messages of arbitrary size. Each message may require multiple memory read or write transfers to happen.

Figure 4:
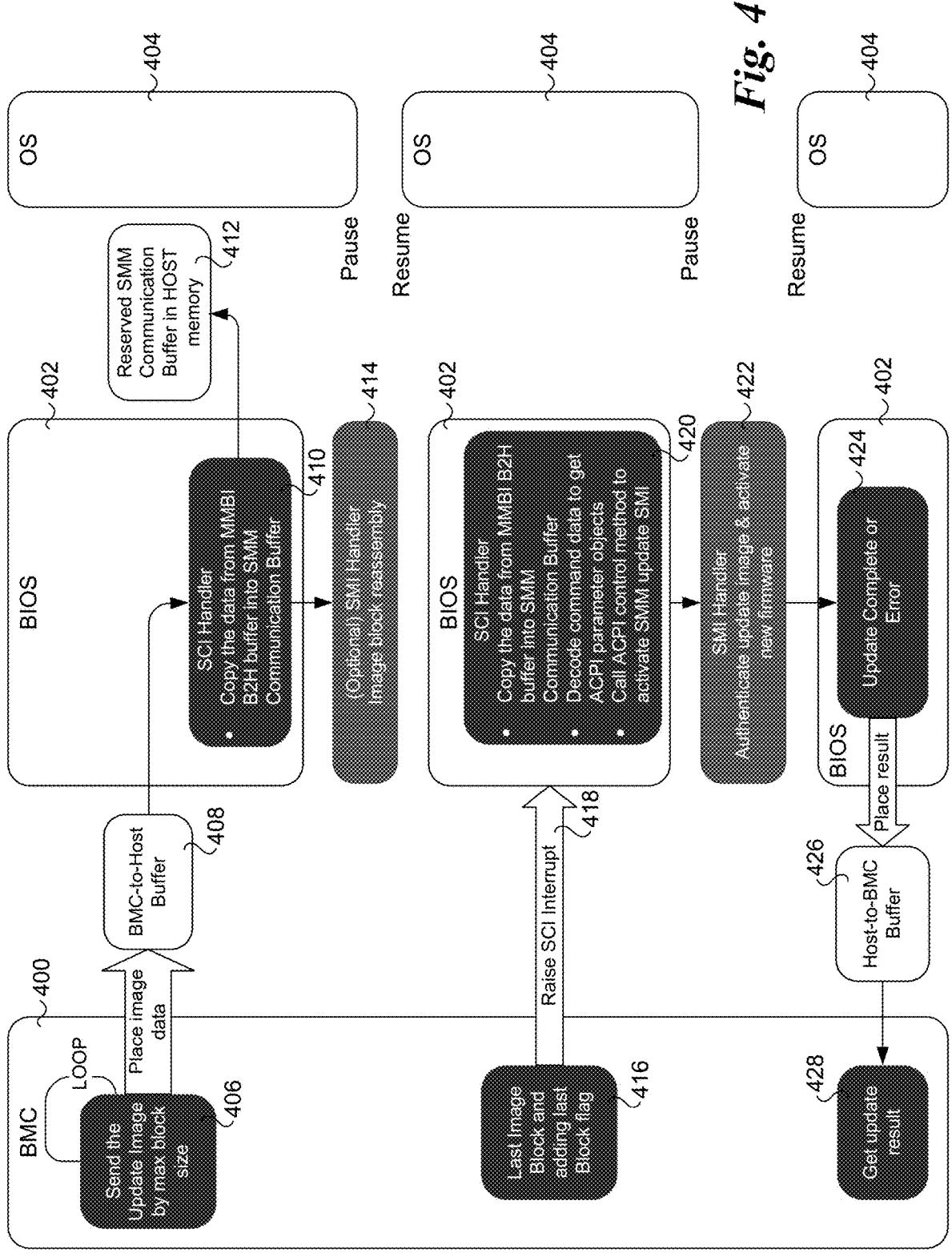
FIG. 4 is a flow diagram that describes the flow to transmit and activate an SMM Runtime Update image with an interrupt driven, shared memory-based transport protocol, according to one embodiment.

FIG. 4 shows a flow diagram 400 that describes the flow to transmit and activate an SMM Runtime Update image with an interrupt driven, shared memory-based transport protocol, according to one embodiment. The flow is between a BMC 400, BIOS 402, and a host OS 404. The flow begins with BMC 400 sending the update image using a maximum block size to BIOS 402 by placing the image (blocks) in BMC-to-Host buffer 408. This operation may need to be repeated depending on whether the update image exceeds the maximum block size.

An SCI hander 410 in BIOS 402 is used to access the update image from BMC-to-Host buffer 408 and copy the data into the SMM communication buffer (e.g., into update capsule 132 in SMM communication buffer 114 in FIG. 1). As depicted in a block 412, the SMM communication buffer is a reserved SMM communication buffer in host memory.

In an optional block 414, an SMI handler performs image block reassembly. When this process is used, host OS 404 is paused while the SMI handler is executing and resumes once the SMI handler has completed.

Returning to sending the update image from BMC 400, as shown in a block 416 the last image block is sent along with a last block flag. BMC 400 then raises an SCI interrupt 418. In response to the SCI interrupt the SCI handler 420 is launched. The SCI handler is used to copy the last block into the SMM communication buffer, decode the command data to get the ACPI parameter objects, and call an ACPI control method to active the SMM update SMI handler.

This launches the SMI handler 422, which is used to authenticate the update image and activate the new firmware. As before, while the SMI handler is executing host OS 404 is paused, with the host OS resuming once the SMI handler has completed.

Upon completion of SMI handler 422 the update is complete or an error has occurred, as depicted in a block 424. BIOS 402 places the result (completion or error) in Host-to-BMC buffer 426, which is then read by BMC 400 to get the update result, as depicted by a block 428.

Figure 5:
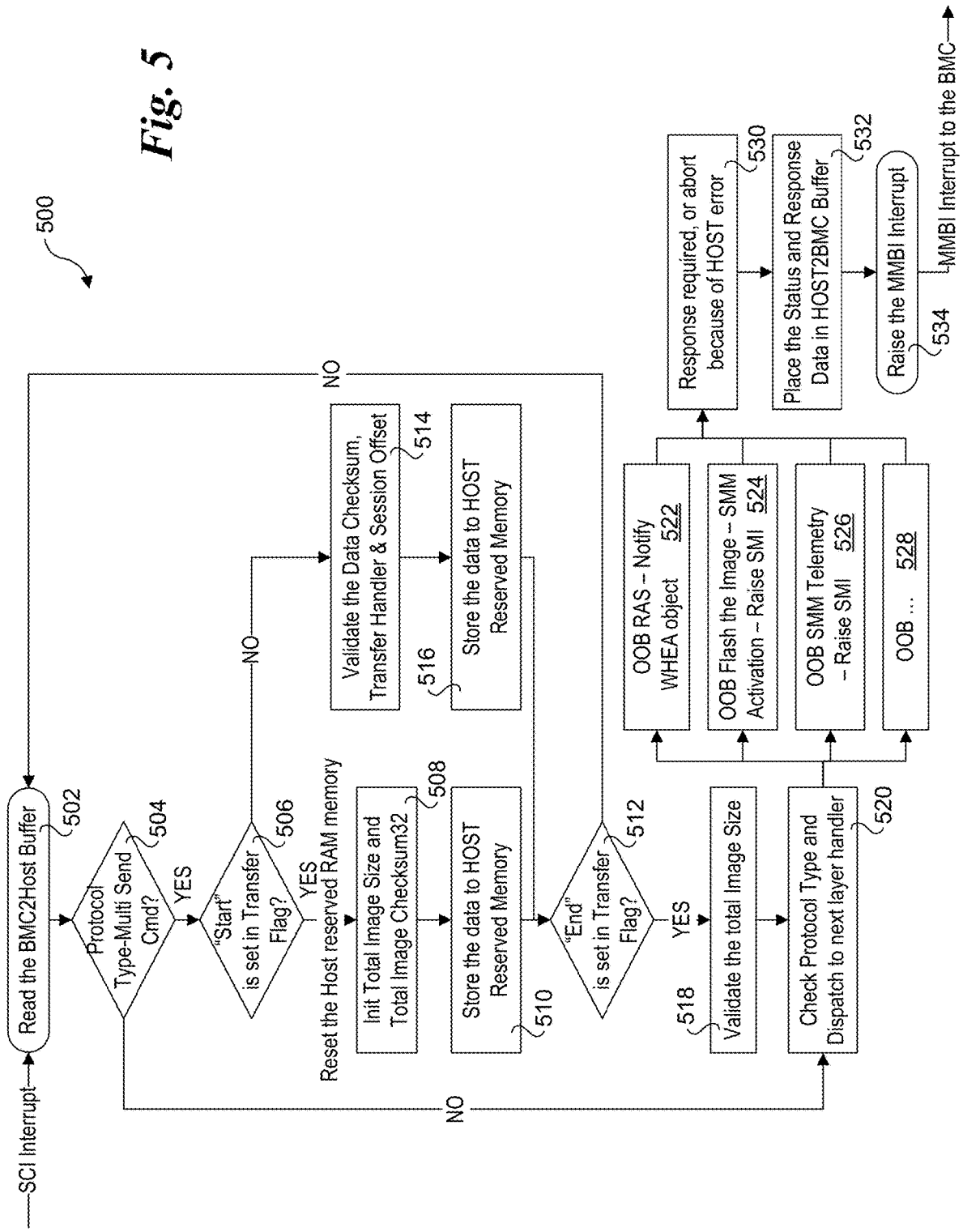
FIG. 5 is a flowchart illustrating further details for transmitting and activating an SMM Runtime Update image, according to one embodiment.

FIG. 5 shows a flowchart 500 illustrating further details for transmitting and activating an SMM Runtime Update image, according to one embodiment. The process begins with an SCI interrupt being received at a start block 502 to cause the BIOS to read the BMC-to-Host buffer. In a decision block 504 a determination is made to whether the protocol type is for a multi-send command. If the answer is YES, to logic proceeds to a decision block 506 in which a determination is made to whether "Start" is set in the transfer flag. If the answer is YES, the host reserved RAM memory is reset.

In a block 508 the total image size and total image checksum32 (32-bit checksum) is initialized. In a block 510 the block of data read from the BMC-to-Host buffer is stored in the host reserved memory, with an image 32-bit checksum used to verify the integrity of the data.

Next, the flow proceeds to a decision block 512 in which a determination is made to whether "End" is set in the transfer flat. For any block that is not the last block, the answer to decision block 512 will be NO, and the logic will loop back to start block 502 to retrieve the next block of data. During the second (and any subsequent passes), the answer to decision block 506 will be NO, since the "Start" will not be set in the transfer flag. In a block 514 the data checksum for the block will be validated, and the data will be transferred (when valid) and stored in the host reserved memory, as shown in a block 516.

The foregoing process will be repeated for any subsequent blocks until the last block is processed. During this pass, when the logic reaches decision block 512 the "End" transfer flag will be set and the answer will be YES, resulting in the logic proceeding to a block 518 in which the total image size will be validated. For example, this may be performed by comparing the total image size that is transferred with the initial total image size.

In a block 520 a check of the protocol type is made, and based on the protocol type, a dispatch is made to a next layer handler. As shown, blocks 522, 524, 526, and 528 represent four non-limiting examples of operations performed by the next layer handle. In block 522 an out-of-band RAS operation is performed, which includes notifying a Windows Hardware Error Architecture (WHEA) object.

In a block 524 an out-of-band process is used to write the image to Flash memory. This is performed by raising an SMI and executing an SMI handler in SMM. In a block 526, and out-of-band process is used to transfer SMM telemetry data. This likewise involves raising an SMI and executing an SMM handler in SMM. Block 528 is representative of another generic out-of-band operation.

The outputs of blocks 522, 524, 526, and 528 flow to a block 530 in which a determination is made whether a response is required, or an abort occurred due to a host error. When a response is required, the status and response data are placed in the Host-to-BMC buffer in a block 532. Following this, in one embodiment an MMBI interrupt is raised, as depicted in an end block 534.

Figure 6:
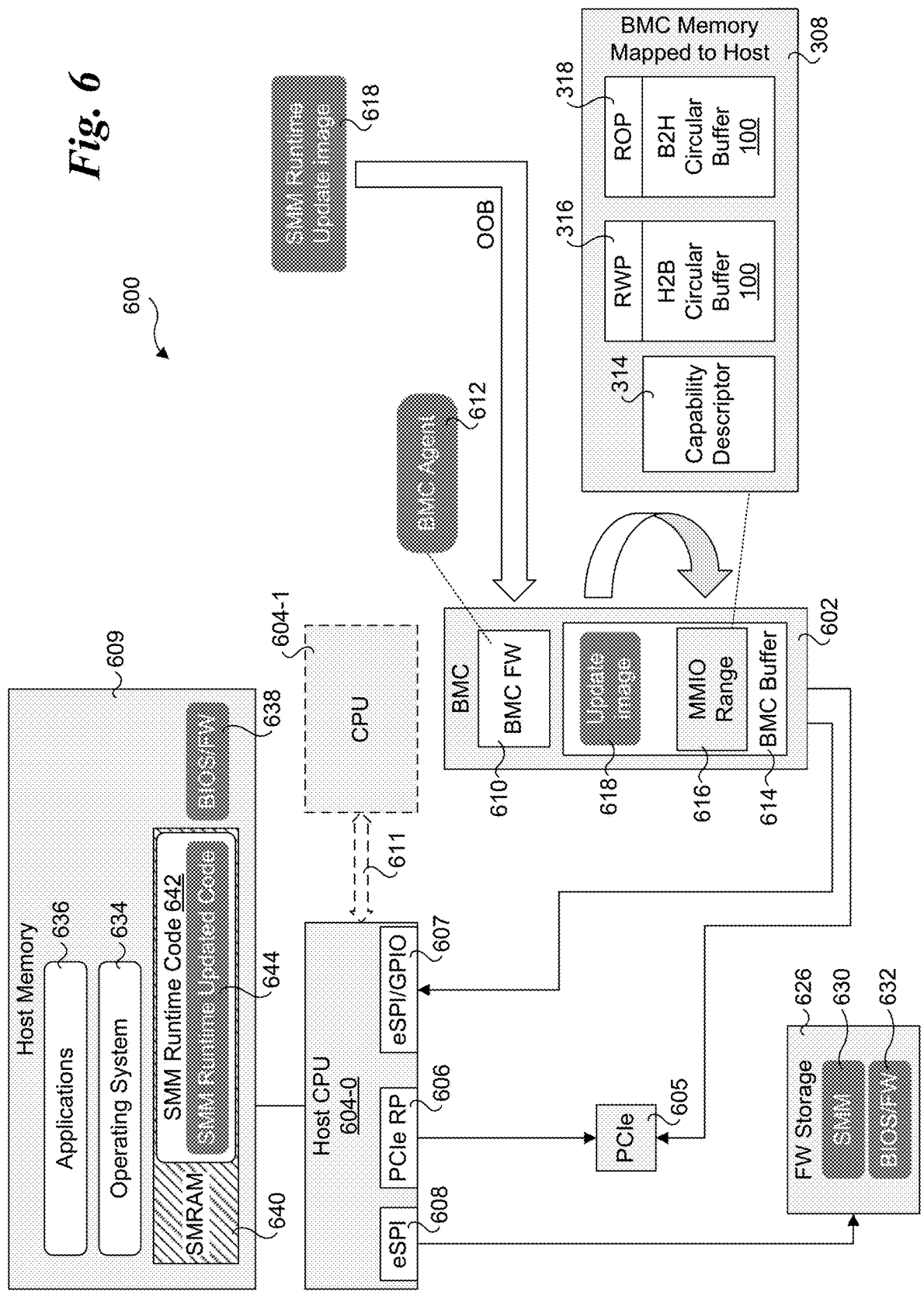
FIG. 6 is a schematic diagram of a platform architecture illustrating a first embodiment of a runtime SMM update method and system used to update SMM code for the platform using an out-of-band controller during host OS runtime.

FIG. 6 shows a platform architecture 600 illustrating an embodiment of a runtime SMM update method used to update SMM code for the platform using an out-of-band controller during host OS runtime. The hardware components include a BMC 602 coupled to host a CPU 604-0 via a PCIe interface/link 605, which is coupled to a PCIe Root Port (RP) 606 on host CPU 604-0. BMC 602 is also coupled to host CPU 604-0 via eSPI/GPIO 609, which is used to implement the interrupt mechanism as describe above for FIG. 3. Host CPU 604-0 is coupled to host memory 609, and may optionally be coupled to one or more other CPUs via (a) socket-to-socket interconnect(s), as depicted by a CPU 604-1 and a socket-to-socket interconnect 611 (both depicted in dashed outline to indicate they are optional). Host CPU 604-0 also includes an eSPI interface 608 that is coupled to a firmware storage device 626 via an eSPI link.

BMC 602 employs BMC firmware 610 including a BMC agent 612 and employs a BMC buffer 614 comprising on-chip memory. A portion of BMC buffer 604 comprises a Memory-Mapped Input-Output (MMIO) range 616 in which BMC memory mapped to host memory 308 is implemented. BMC 602 includes an embedded processor, processor element, controller, engine, etc., (not shown) on which BMC agent 612 is executed.

Multiple software and firmware components are loaded into host memory 609 and executed on host CPU 604-0. The software components include an operating system 634 and applications 636. The firmware components include BIOS/FW 638 and SMM runtime updated code 640 which is stored in SMRAM 642. During platform boot operations, all or a portion of BIOS/FW 632 stored in FW storage device 626 is executed and loaded into a protected region of host memory 609, as depicted by BIOS/FW 638. In addition, SMRAM 640 is allocated via execution of BIOS/FW 632 and SMM FW code 630 in FW storage device 626 is loaded as SMM runtime code 642.

During OS runtime, an update capsule including an SMM runtime update image 618 is received by BMC 602 using an out-of-band channel such as but not limited to a management network. BMC agent 612 first stores SMM runtime update image 618 in BMC buffer 614. Subsequently, the process flows in FIGS. 2a, 2b, 4, and 5 are performed to effect the SMM runtime update, resulting in SMM runtime code 642 being updated with SMM runtime updated code 644.

Figure 6A:
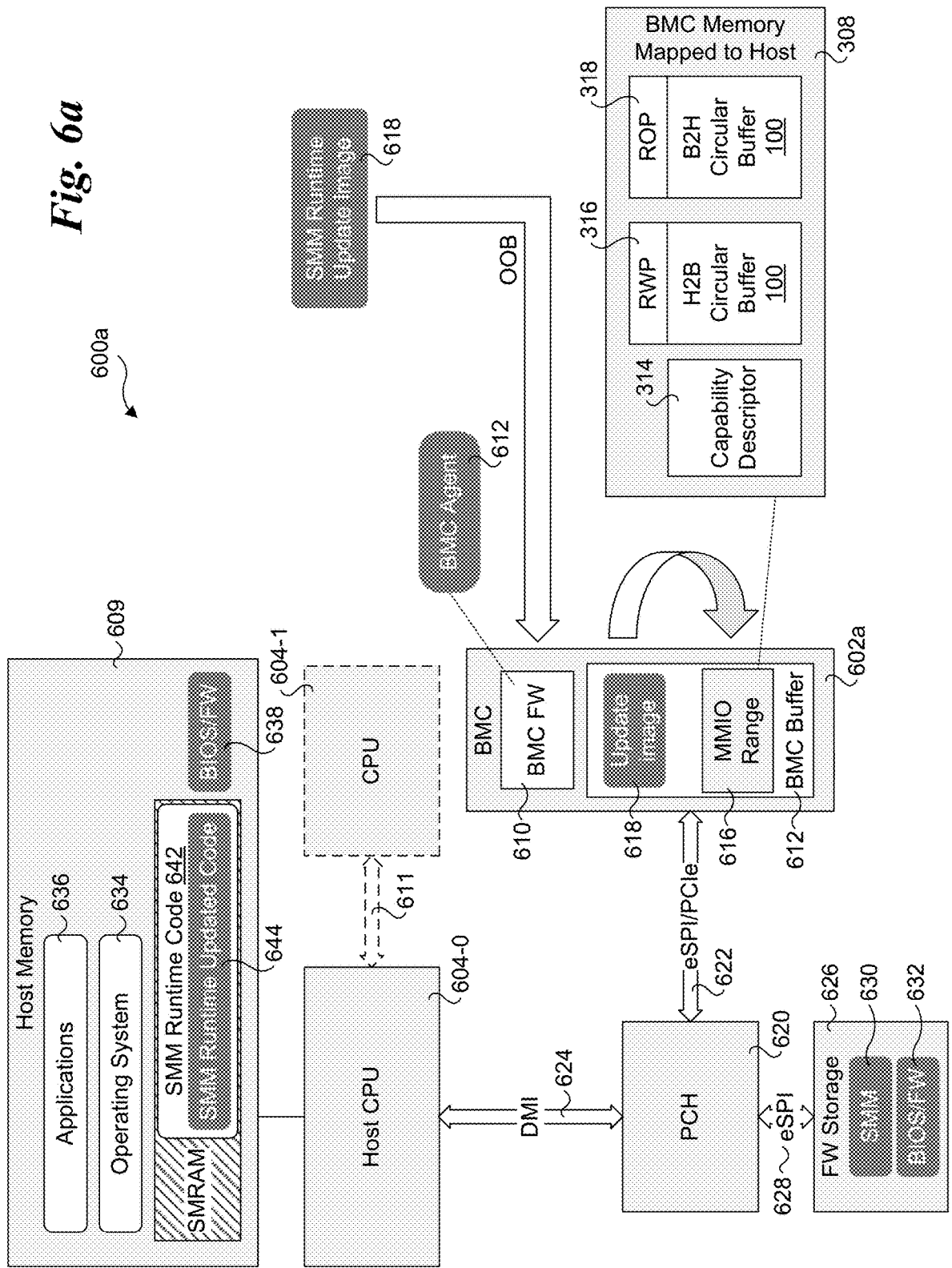
FIG. 6a is a schematic diagram of a platform architecture including a platform controller hub (PCH) illustrating a second embodiment of a runtime SMM update method and system used to update SMM code for the platform using an out-of-band controller during host OS runtime.

FIG. 6a shows a platform architecture 600a including a PCH 620, which is coupled to a BMC 602 via an eSPI/PCIe link 622 and is coupled to host CPU 604-0 via a Direct Media Interconnect (DMI) link 624. The remaining components in platform architecture 600a share reference numbers with similar components in platform architecture 600 discussed above. The process flow is similar in both embodiments, with the exception that in platform architecture 600a data and interrupt signals are forwarded from BMC 602a to CPU 604-0 via PCH 620 rather than via the direct links and signal paths used by platform architecture 600.

Figure 7:
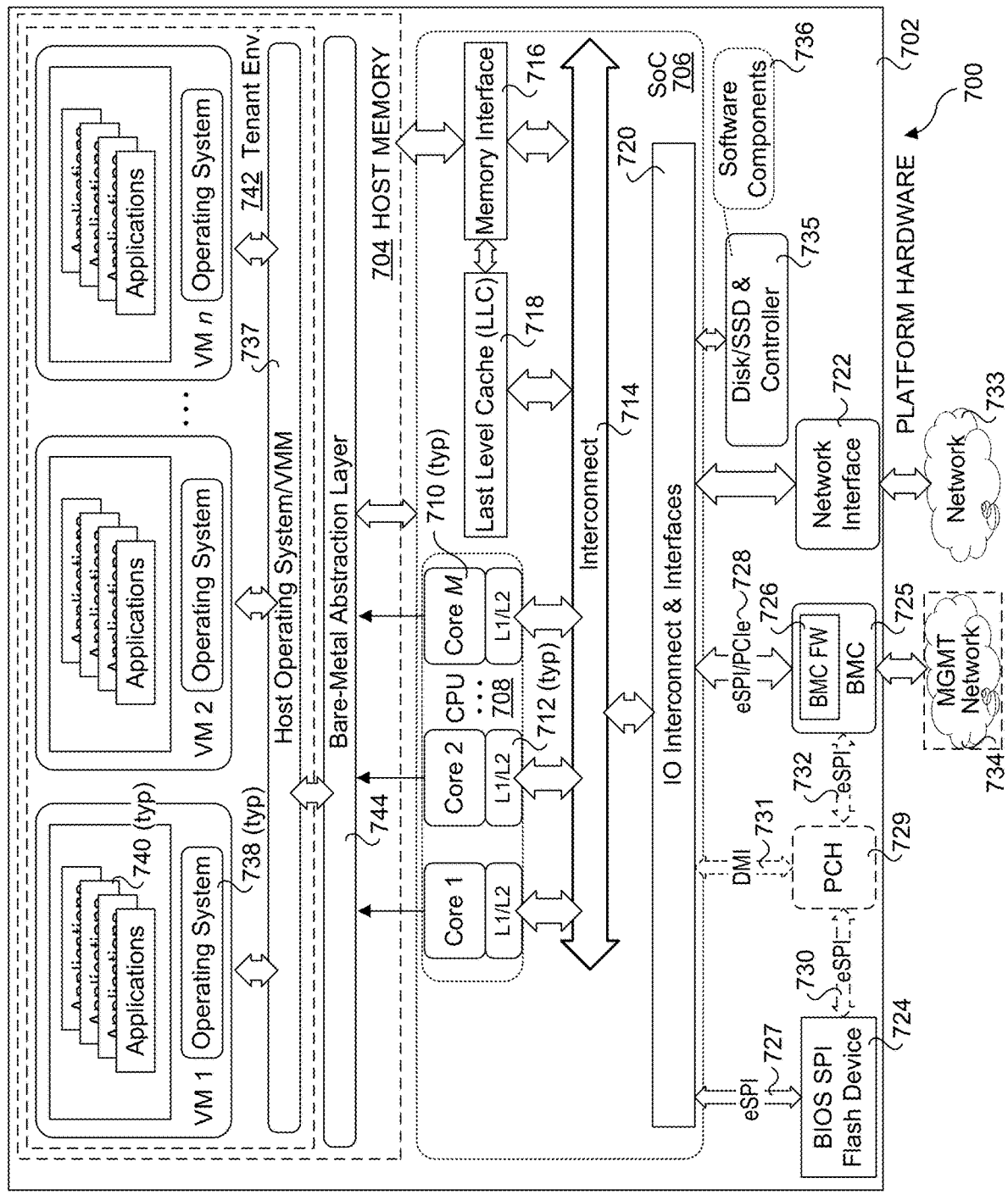
FIG. 7 is a schematic diagram of an exemplary bare metal platform architecture on which embodiments disclosed herein may be implemented.

FIG. 7 shows an embodiment of a bare metal cloud platform architecture 700 corresponding to a bare metal platform suitable for implementing aspects of the embodiments described herein. Architecture 700 includes a hardware layer in the lower portion of the diagram including platform hardware 702, and a software layer that includes software components running in host memory 704. Architecture 700 implements the modular microcode (uCode) patch method to support runtime persistent update, as illustrated by the BIOS flash layout depicted for BIOS flash device 724 corresponding to the BIOS flash layout of diagram 300 in FIG. 3.

Platform hardware 702 includes a processor 706 having a System on a Chip (SoC) architecture including a central processing unit (CPU) 708 with M processor cores 710, each coupled to a Level 1 and Level 2 (L1/L2) cache 712. Each of the processor cores and L1/L2 caches are connected to an interconnect 714 to which each of a memory interface 716 and a Last Level Cache (LLC) 718 is coupled, forming a coherent memory domain. Memory interface is used to access host memory 704 in which various software components are loaded and run via execution of associated software instructions on processor cores 710.

Processor 706 further includes an IO interconnect hierarchy, which includes one or more levels of interconnect circuitry and interfaces that are collectively depicted as IO interconnect & interfaces 720 for simplicity. Various components and peripheral devices are coupled to processor 706 via respective interfaces (not all separately shown), including a network interface 722, a BIOS SPI flash device 724, and a BMC 725 including BMC firmware 726. Generally, the interfaces illustrated in FIG. 6 may be used to support communication between processor 706, BIOS SPI flash device 724, and BMC 725, as depicted by an eSPI link 727 and an eSPI/PCIe link 728. As an option, BIOS SPI flash device 724 may be operatively coupled to processor 706 via a PCH 729 with communications routed over an eSPI link 730 and a DMI link 731. Under this option, PCH 729 is also connected to BMC 725 via an eSPI link 732. (Additional links and/or GPIO signal paths are not shown for simplicity.)

Network interface 722 is connected to a network 733. In some embodiments, BMC 725 is connected to a management network 734 that is separate from network 733. In other embodiments, BMC 725 either is connected to network 733 using a built-in or separate network interface (both not shown) or BMC 725 is configured to communicate with external entities coupled to network 733 via network interface 722.

Platform hardware 702 also includes a disk drive or solid-state disk (SSD) with controller 735 in which software components 736 are stored. Optionally, all or a portion of the software components used to implement the software aspects of embodiments herein may be loaded over a network 733 accessed by network interface 722.

During platform initialization, firmware comprising BIOS and various UEFI (unified extensible firmware interface) modules (not separately shown) are loaded into host memory 704 and booted, followed loading and initialization of various software components. The software components include a host operating system and a VMM 737 (that would sit above the host operating system but is not shown separately) used to host n virtual machines (VMs) VM 1, VM 2 . . . VM n, each including an operating system 738 on which one or more applications 740 are run. Platform architectures employing containers, such as Docker®-type containers, may be implemented in a similar manner. In addition, non-virtualized computing platforms that only run a single instance of an operating system (e.g., applications run directly on host operating system 738) may also be used.

As further illustrated in FIG. 7, the software components in host memory 704 that include host operating system/VMM 737 and above are part of tenant environment 742. Meanwhile, software components depicted as a bare metal abstraction layer 744 are part of the cloud service provide environment. Generally, the cloud service provider environment will provide mechanisms to support separate access to tenant environment 742 and portions of host memory 704 that are used by the bare-metal abstraction layer 744. In some embodiments, the bare metal cloud platform hardware and bare metal abstraction layer are part of a trusted computing base (TCB).

For multi-socket bare metal cloud platforms, the platform architecture would be somewhat similar to that shown in FIG. 7, but with multiple processors (CPUs), each in its own socket, and socket-to-socket interconnects connecting the sockets. Each CPU/socket would also be provided with applicable interfaces to communicate with BIOS SPI Flash device 724 and BMC 725, as well as other IO components.

For historical reasons, the term "BIOS" is used throughout this disclosure, including the drawings. The name itself originates from the Basic Input/Output System used in the CP/M operating system in 1975. Those skilled in the art will recognize that BIOS refers to the system firmware, such as but not limited to UEFI firmware. The techniques may also apply to other forms of BIOS and/or firmware such as BIOS/firmware used in CPUs and processors employing ARM™ architectures.

As used herein, "runtime" and "operating system runtime" refer to an operational phase of a platform following booting of a host operating system. Accordingly, when the host operating system is paused during an SMM runtime update process, the host operating system is still in runtime through the process. Moreover, when the host operating system is paused it is unaware of any operations being performed by the CPU(s) on the bare metal platform and the out-of-band SMM runtime update process provided by the embodiments herein are transparent to the host operating system.

As discussed above, "out-of-band" means a communication channel that does not employ communication facilities provided by an operating system, such as a network software stack. As a result, out-of-band communications are implemented separate and apart from communications in the tenant environment involving the host operating system.

In the foregoing examples, the use of SMM' terminology is used. SMM is an example of a secure execution mode. It will be understood that the use of SMM is merely exemplary and non-limiting, as the teachings and principles disclosed herein may be applied to other types of secure execution modes. As used herein, including the claims, secure execution mode is an execution mode of the processor during which execution of an operating system is paused and provides access to firmware code and hardware that is otherwise not accessible outside of the secure execution mode.

In addition to applying secure execution mode firmware for computing platforms with CPUs, the teaching and principles disclosed herein may be applied to Other Processing Units (collectively termed XPUs) including one or more of Graphic Processor Units (GPUs) or General Purpose GPUs (GP-GPUs), Tensor Processing Unit (TPU) Data Processor Units (DPUs), Artificial Intelligence (AI) processors or AI inference units and/or other accelerators, FPGAs and/or other programmable logic (used for compute purposes), etc. While some of the diagrams herein show the use of CPUs, this is merely exemplary and non-limiting. Generally, any type of XPU may be used in place of a CPU in the illustrated embodiments. Moreover, as used in the following claims, the term "processor" is used to generically cover CPUs and various forms of XPUs.

In addition to CPU/processor BIOS, techniques similar to those disclosed herein may apply to XPU BIOS and/or firmware, such as GPU vBIOS, for example.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software and/or firmware running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
   during runtime operation of a host operating system on a bare metal platform having a management controller and including a processing unit on which the host operating system and host BIOS are executed,
      performing a runtime update of secure execution mode runtime firmware for the bare metal platform using an out-of-band channel comprising an interrupt driven, shared memory-based data exchange channel between the management controller and the host BIOS.

2. The method of claim 1, wherein the bare metal platform includes host memory, and the method comprises:
   receiving, at the management controller, an update capsule containing a secure execution mode runtime update image;
   buffering the secure execution mode runtime update image in memory on-board the management controller, at least a portion of the on-board memory being memory-mapped to an address space in the host memory; and
   using one or more out-of-band data transfers to transfer the secure execution mode runtime update image into a reserved secure execution mode buffer in the host memory.

3. The method of claim 2, wherein the management controller comprises a Baseboard Management Controller (BMC), further comprising:
   a) placing image data comprising all or a portion of the secure execution mode runtime update image in a memory-mapped BMC-to-host buffer;

b) raising, by the BMC, an interrupt; and in response, c) executing an interrupt handler in BIOS to copy the image data from the BMC-to-host buffer to the reserved secure execution mode buffer in the host memory; and d) repeating, as necessary, operations a), b), and c) until an entirety of the secure execution mode runtime update image is copied to the reserved secure execution mode buffer.

4. The method of claim 3, wherein the bare metal platform further comprises one or more Advanced Configuration and Power Interface (ACPI) components, wherein a portion of the host BIOS comprises ACPI BIOS, wherein the interrupt comprises a System Control Interrupt (SCI), and the interrupt handler comprises an SCI handler in the ACPI BIOS.

5. The method of claim 2, further comprising:
employing a secure execution mode interrupt handler to activate the secure execution mode runtime update image.

6. The method of claim 5, further comprising:
logging telemetry data relating to activation of the secure execution mode runtime update image using the secure execution mode interrupt handler.

7. The method of claim 6, wherein the telemetry data is logged in a reserved portion of host memory allocated for the secure execution mode, further comprising:
reading, using an out-of-band channel, telemetry data that is logged from the reserved portion of host memory into a buffer on the management controller.

8. The method of claim 1, wherein the management controller comprises a Baseboard Management Controller (BMC), and the out-of-band channel employs a memory mapped BMC interface (MMBI) protocol.

9. The method of claim 8, wherein the MMBI protocol employs two memory mapped buffers on the BMC including a BMC-to-host buffer used for sending data from the BMC to the host BIOS over the out-of-band channel and a host-to-BMC buffer used for receiving data from the host BIOS.

10. A bare metal platform, comprising:
a host central processing unit (CPU);
host memory, coupled to the host CPU; and
a management controller, communicatively coupled directly or indirectly to the host CPU and having an onboard memory buffer,
wherein the bare metal platform is configured to be implemented in a cloud service provider environment in which a host operating system and host BIOS are executed on the host CPU, and wherein the bare metal platform is configured to perform a runtime update of secure execution mode runtime firmware for the bare metal platform using an out-of-band channel comprising an interrupt driven, shared memory-based data exchange channel between the management controller and the host BIOS.

11. The bare metal platform of claim 10, further configured to:
receive, at the management controller, an update capsule containing a secure execution mode runtime update image;
buffer the secure execution mode runtime update image in memory on-board the management controller, at least a portion of the on-board memory being memory-mapped to an address space in the host memory; and
employ one or more out-of-band data transfers to transfer the secure execution mode runtime update image into a reserved secure execution mode buffer in the host memory.

12. The bare metal platform of claim 11, wherein the management controller comprises a Baseboard Management Controller (BMC), further configured to:
a) place image data comprising all or a portion of the secure execution mode runtime update image in a memory-mapped BMC-to-host buffer;
b) raise, by the BMC, an interrupt; and in response,
c) execute an interrupt handler in BIOS to copy the image data from the BMC-to-host buffer to the reserved secure execution mode buffer in the host memory; and
d) repeat, as necessary, operations a), b), and c) until an entirety of the secure execution mode runtime update image is copied to the reserved secure execution mode buffer.

13. The bare metal platform of claim 12, wherein the bare metal platform further comprises one or more Advanced Configuration and Power Interface (ACPI) components, wherein a portion of the host BIOS comprises ACPI BIOS, wherein the interrupt comprises a System Control Interrupt (SCI), and wherein the interrupt handler comprises an SCI handler in the ACPI BIOS.

14. The bare metal platform of claim 11, further configured to:
employ a secure execution mode interrupt handler to activate the secure execution mode runtime update image.

15. The bare metal platform of claim 14, further configured to:
log telemetry data relating to activation of the secure execution mode runtime update image using the secure execution mode interrupt handler.

16. A management controller including a memory buffer configured to be implemented on a bare metal platform provided by a cloud service provider and including host memory and a host central processing unit (CPU) coupled to the host memory on which a host operating system and host BIOS are executed, the management controller configured to be communicatively coupled directly or indirectly to the host CPU, wherein the management controller is configured to:
during runtime operation of the host operating system,
receive an update capsule containing a secure execution mode runtime update image;
buffer the secure execution mode runtime update image in the memory buffer; and
implement an out-of-band channel comprising an interrupt driven, shared memory-based data exchange channel between the host BIOS and the management controller.

17. The management controller of claim 16, wherein the management controller comprises a Baseboard Management Controller (BMC), further comprising a memory-mapped BMC-to-host buffer and further configured to:
a) place image data comprising all or a portion of the secure execution mode runtime update image in the memory-mapped BMC-to-host buffer;
b) raise an interrupt to the host BIOS to cause the host BIOS to execute an interrupt handler to copy the image data from the BMC-to-host buffer to a reserved secure execution mode buffer in the host memory; and
c) repeat, as necessary, operations a) and b) until an entirety of the secure execution mode runtime update image is copied to the reserved secure execution mode buffer.

18. The management controller of claim 17, wherein the bare metal platform further comprises one or more Advanced Configuration and Power Interface (ACPI) components, wherein a portion of the host BIOS comprises ACPI BIOS, wherein the interrupt comprises a System Control Interrupt (SCI), and the interrupt handler comprises an SCI handler in the ACPI BIOS.

19. The management controller of claim 16, wherein the bare metal platform includes a platform controller hub (PCH) coupled to the host processor and wherein the management controller is configured to be coupled to the PCH.

20. The management controller of claim 16, wherein the management controller comprises a Baseboard Management Controller (BMC) and the memory buffer comprises two memory mapped buffers including a BMC-to-host buffer used for sending data from the BMC to the host BIOS over the out-of-band channel and a host-to-BMC buffer used for receiving data from the host BIOS.

* * * * *